United States Patent [19]
Noggle

[11] Patent Number: 5,854,656
[45] Date of Patent: Dec. 29, 1998

[54] NON-UNIFORM CLOCKING SYSTEM FOR AREA IMAGING DEVICE

[75] Inventor: Thomas Lynn Noggle, Oakland, Calif.

[73] Assignee: Logitech, Inc., Fremont, Calif.

[21] Appl. No.: 558,096

[22] Filed: Nov. 15, 1995

[51] Int. Cl.$^6$ .................................................. H04N 5/335
[52] U.S. Cl. .......................................... 348/311; 348/441
[58] Field of Search .................................... 348/207, 239, 348/311, 312, 314, 294, 441, 445, 440; H04N 5/335

[56] References Cited

U.S. PATENT DOCUMENTS

| | | | |
|---|---|---|---|
| 4,734,772 | 3/1988 | Akiyama | 348/311 |
| 5,196,939 | 3/1993 | Elabd et al. | 348/314 |
| 5,450,129 | 9/1995 | Matoba et al. | 348/312 |
| 5,486,859 | 1/1996 | Matsuda | 348/311 |
| 5,491,512 | 2/1996 | Irakura et al. | 348/311 |
| 5,510,836 | 4/1996 | Stekelenburg | 348/311 |

*Primary Examiner*—Andrew Faile
*Assistant Examiner*—Tuan V. Ho
*Attorney, Agent, or Firm*—Fenwick & West LLP

[57] ABSTRACT

An area imaging device comprises an area image sensor and means to adjust the vertical and horizontal clocking rate used to transfer pixels from an array of photo-sensors to a serial output of the area image sensor. The non-uniform clocking rates of the present invention reduce the amount of memory necessary to implement pan and zoom features by effectively separating image and non-image pixels during scanning. This also allows images collected in one format to be displayed on a display device designed for a second format. For each image scan, the area image sensor is divided into active, recovery, and inactive regions according to whether the pixels within the region are displayed, adjacent to displayed pixels, or neither adjacent to image pixels nor displayed, respectively. Rows of pixels are transferred to a horizontal shift register at a vertical scanning rate which is increased for rows that include no image pixels. The pixels of each row are then clocked out of the horizontal shift register at a rate that is adjusted according to the region of the area image sensor in which the pixels originated. Non-image pixels are shifted out at a high rate, while image pixels are shifted out at a rate that minimizes distortion of the image. Recovery pixels which segregate image and non-image pixels, are shifted out of the horizontal shift register at a slow rate to flush charge transfer cells of any accumulated excess charges.

13 Claims, 8 Drawing Sheets

NON-UNIFORM CLOCKING SYSTEM FOR AREA IMAGING DEVICE

BACKGROUND OF THE INVENTION

1. Technical Field

This invention relates to the field of imaging devices, and in particular to the systems and methods for adjusting the rate at which data is read from imaging devices.

2. Background Art

Conventional area imaging devices employ uniform clocking schemes to transfer pixel data from a two-dimensional array of photo-detectors to a serial output. In these schemes, the transfer of pixel data from the photo-detectors to the serial output is characterized by three clocking rates, $(T_{hclk})^{-1} > (T_{vclk})^{-1} > (T_{clk})^{-1}$. Pixel data in the form of electrical charges are accumulated on photo-detectors and coupled to associated charge transfer cells of a vertical shift register at a rate $(T_{clk})^{-1}$ (integration period $T_{clk}$). The charges from each row of photo-detectors are then shifted up the charge transfer cells of the vertical shift registers at a rate $(T_{vclk})^{-1}$, with the top most row of pixel data being shifted into the charge transfer cells of a horizontal shift register. The row of pixel data is then shifted out of the horizontal shift register at a rate $(T_{hclk})^{-1}$. In conventional area imaging devices each transfer rate of the pixel transfer cycle is kept constant.

The use of uniform clocking schemes imposes a number of limitations on certain standard features of area imaging devices, such as panning and zooming (magnification) of captured images. Uniform clocking schemes also limit the manner in which area imaging devices can be adapted to different broadcast standards. For example, panning involves the selection and display of a selected subset of pixels (the active image area) from the area image sensor. Conventional area image sensors require a frame buffer memory to implement this feature. The complete image is first stored in the frame buffer memory, and the selected subset of pixels is identified and retrieved from the memory for display. Similarly, conventional area imaging sensors implement zooming by first storing the complete image in a frame buffer memory and then selecting and magnifying the desired subset of pixels. Frame buffer memory is expensive, and its use in conventional area imaging devices increases the cost of manufacturing these devices.

Conventional area imaging devices are typically designed for use with one of two major broadcast standards. Image sensors meeting the PAL standard have one of two formats, 582 lines of 512 pixels each or 582 lines of 752 pixels each and are designed to be scanned at 50 Hz. Image sensors meeting the NTSC standard have 480 lines of 512 pixels each and are designed to be scanned at 60 Hz. Typically, devices designed for one standard do not accommodate images from the other standard. PAL images cannot be fully displayed on devices designed for NTSC images and the display of NTSC images on PAL devices leaves unused pixels that must be flushed on each data transfer cycle.

Thus, there is a need for area imaging devices capable of supporting pan and zoom features without the cost and complexity of additional memory and accommodating images based on different broadcast standards.

SUMMARY OF THE INVENTION

The present invention is a system and method for scanning the area image sensor of an area imaging device using a non-uniform clocking scheme in order to reduce the amount of memory necessary to implement pan and zoom features. The non-uniform clocking scheme also provides an efficient means for accommodating multiple broadcast standards in a single area imaging device. In accordance with the present invention, the area image sensor is divided into image and non-image regions. Pixels originating in the non-image region are transferred out of a shift register at high clocking rates, while pixels originating in the image region are transferred at or below the recommended clocking rates for the shift register. Non-image pixels adjacent to image pixels are clocked at a rate that allows the area image sensor to recover from the effects of overclocking non-image pixels. The present invention minimizes the time delays associated with scanning through non-image pixels, while providing full field exposure times for all pixel data within the active image area. The advantages of the present invention are thus achieved without degrading the quality of the displayed image.

An area imaging device in accordance with the present invention comprises an area image sensor and means to adjust the vertical and horizontal scanning rate as pixels originating in different regions of the area image sensor are processed. For each scan, the area image sensor is divided into active, recovery, and inactive regions according to whether the pixels within the region are displayed, adjacent to displayed pixels, or neither adjacent to image pixels nor displayed, respectively. Rows of pixels are transferred to a horizontal shift register at a vertical scanning rate which may be increased for rows that include no image pixels, and the horizontal scanning rate at which each pixel of a row is clocked out of the horizontal shift register is adjusted according to the region of the areas image sensor in which the pixel originated.

In the disclosed embodiment, pixels in the inactive region are clocked out of the horizontal shift register at greater clocking rates than the rate recommended for proper operation of the shift register and desired image quality. For example, clocking rates for the horizontal shift register may be on the order of ten times the recommended rate. The pixels of the inactive region do not contribute to the displayed image and consequently accumulated charges generated by overclocking do not degrade the displayed image. Pixels originating in the active region are clocked out at a rate that is at or below the recommended clocking rate, allowing the corresponding charges to be fully transferred, minimizing distortion. Pixels originating in the recovery region are clocked out of the charge transfer cells of the horizontal shift register at rates that allow sufficient time to sweep charges accumulated in the transfer cells during overclocking. The recovery clocking rate is always lower than the rate for pixels from the inactive region, but it may be greater or less than the recommended clocking rate.

The active image region may be selected for panning or zooming using a pointing device like a mouse or trackball. Alternatively, the active area may be selected under software control by, for example, an application program. In the case of images based on different broadcast standards, the active image region is defined by the standard as, for example, the first 480 lines of data for NTSC images are recorded on PAL equipment. Use of recovery regions adjacent vertically and horizontally to the active region allows charge transfer cells in the horizontal and vertical shift registers to be swept of accumulated charge before pixels originating in the active region are processed.

In accordance with the present invention, circuitry is provided for receiving information designating the active region of the area image sensor, defining a recovery region relative to this active area, and adjusting the clocking rates of the area image sensor as the area imaging device transits the active, recovery, and inactive regions.

DETAILED DESCRIPTION OF THE INVENTION

Figure 1A:
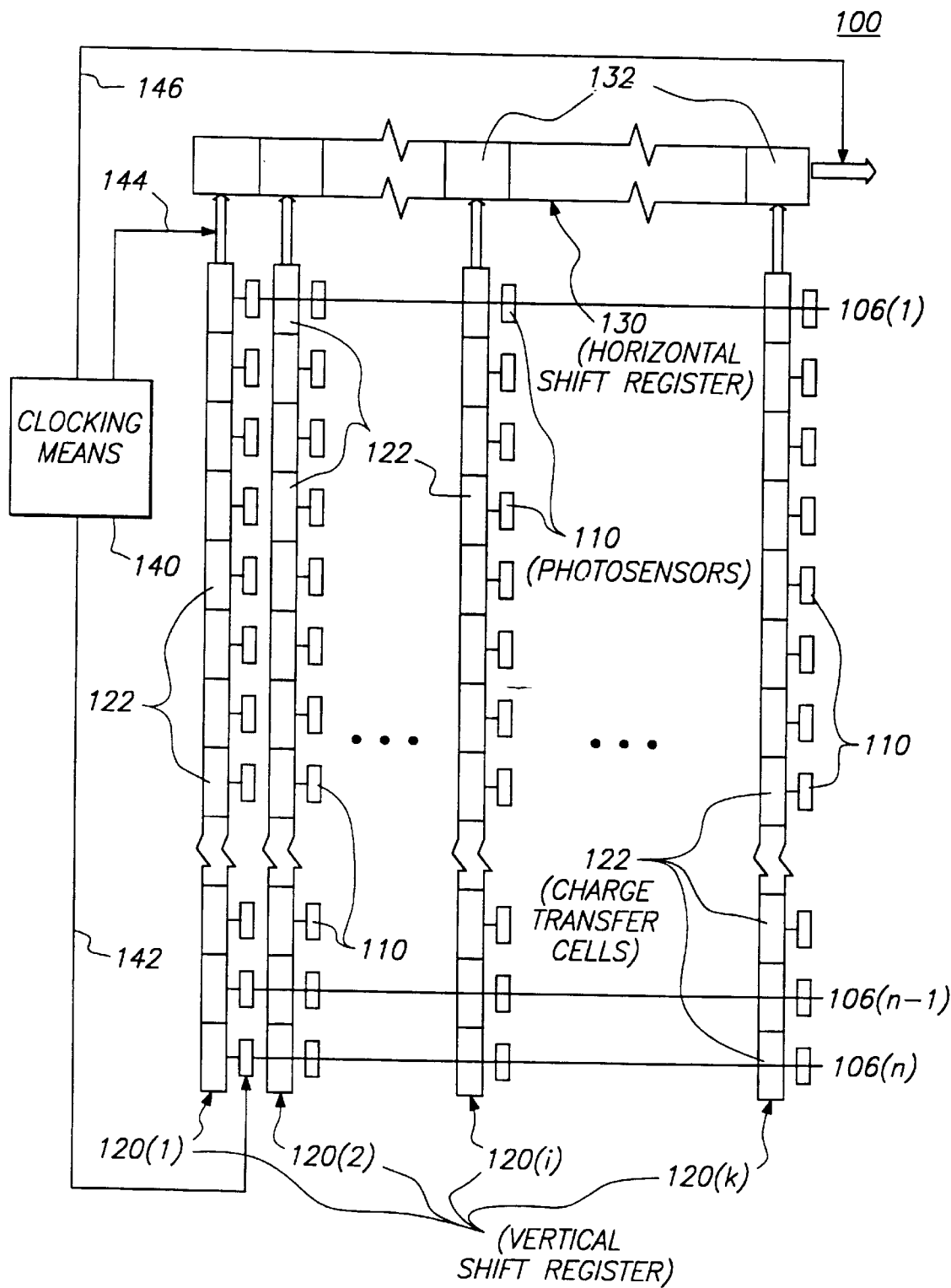
FIG. 1A is a block diagram of a conventional area imaging device including an array of photo-sensitive detectors coupled to a serial output through vertical and horizontal shift registers.

Referring to FIG. 1A, there is shown a schematic representation of an area imaging device 100 comprising photo sensors 110, vertical shift registers 120(1)–120(k), a horizontal shift register 130, and clocking means 140. Each photo-sensor 110 corresponds to an image pixel. Vertical shift registers 120(1)–120(k) each comprise n-charge transfer cells 122, and each charge transfer cell 122 is coupled to one of photo-sensors 110. Clocking means 140 comprises integration, vertical, and horizontal clocking lines 142, 144, 146, respectively, for controlling signal transfers between various elements of area imaging device 100, as described below.

Figure 1B:
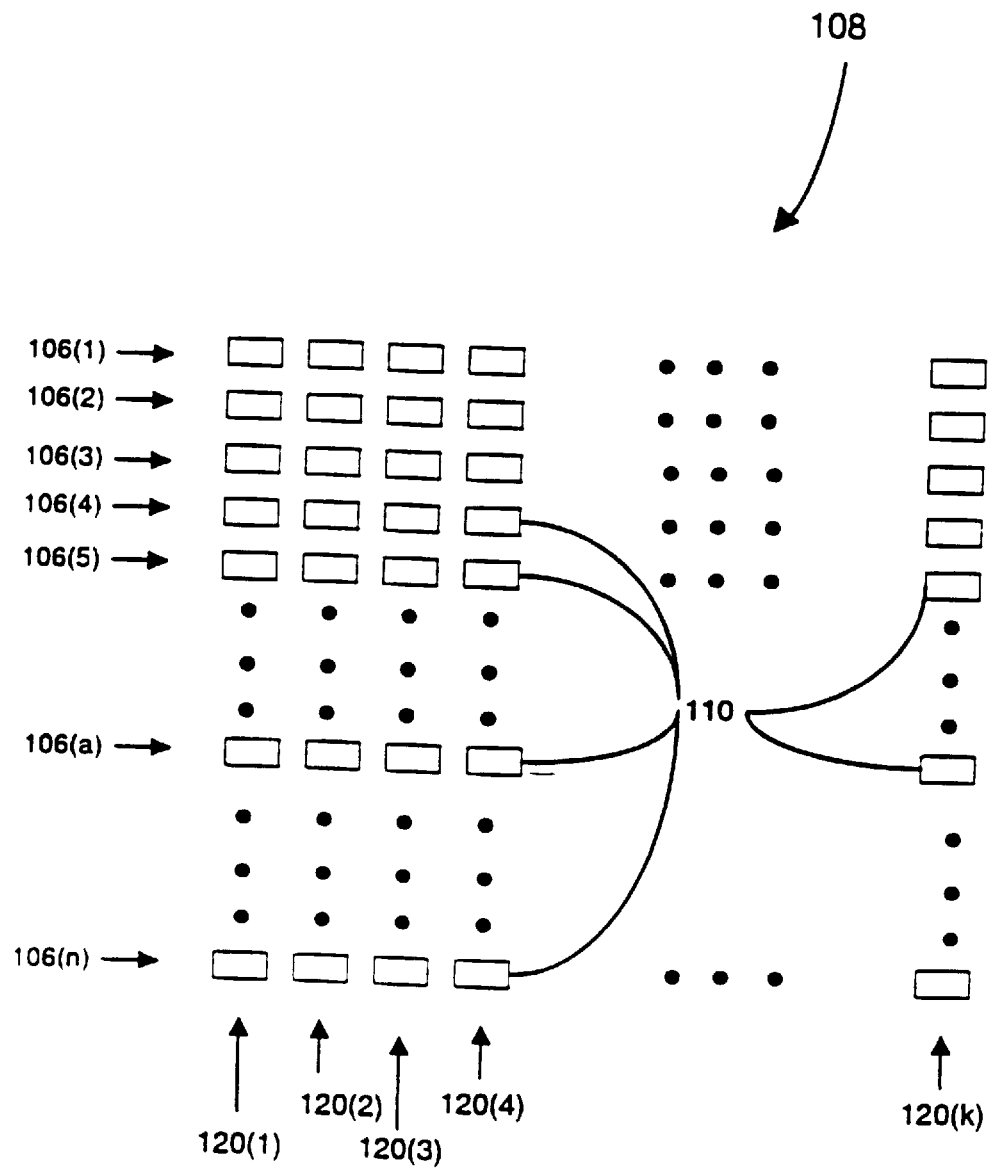
FIG. 1B is a block diagram of an area image array formed by the sensors of the area imaging device of FIG. 1A.

Referring now to FIG. 1B, there is shown an area image array 108 formed by n-rows 106 of k-photo-sensors 110, one for each shift register 120(1)–(k).

Photo-sensors 110 are light sensitive elements such as silicon photo-diodes, which generate charges when exposed to light in selected wavelength bands. These charges accumulate at photo-sensors 110 during an integrating period, $T_{clk}$, and are coupled to adjacent charge transfer cells 122 of shift registers 120(1)–120(k) when triggered by a clocking pulse on integration line 142. The transferred charges occupy n-rows 106(1)–106(n) of k-charge transfer cells 122 each. Rows 106(1)–106(n) of pixel data are moved up vertical shift register 120(1)–120(k) in response to a signal from clocking means 140 on vertical signal line 144. Vertical signal line 144 shifts the charges occupying first row 106(1) of charge transfer cells 122 into charge transfer cells 132 of horizontal shift register 130 at a rate $(T_{vclk})^{-1}$ where $T_{vclk}$ is the period between signals on vertical signal line 144. The charges in k-charge transfer cells 132 are then clocked out of a serial output 134 of horizontal shift register 130 by horizontal signal line 146 at a rate $(T_{hclk})^{-1}$. In order to clear all n·k photo-cells 110 from area image array 108 within integration period $T_{clk}$ without losing data, $k \cdot (T_{hclk}) \leq T_{vclk}$ and $n \cdot (T_{vclk}) \leq T_{clk}$.

Figure 2:
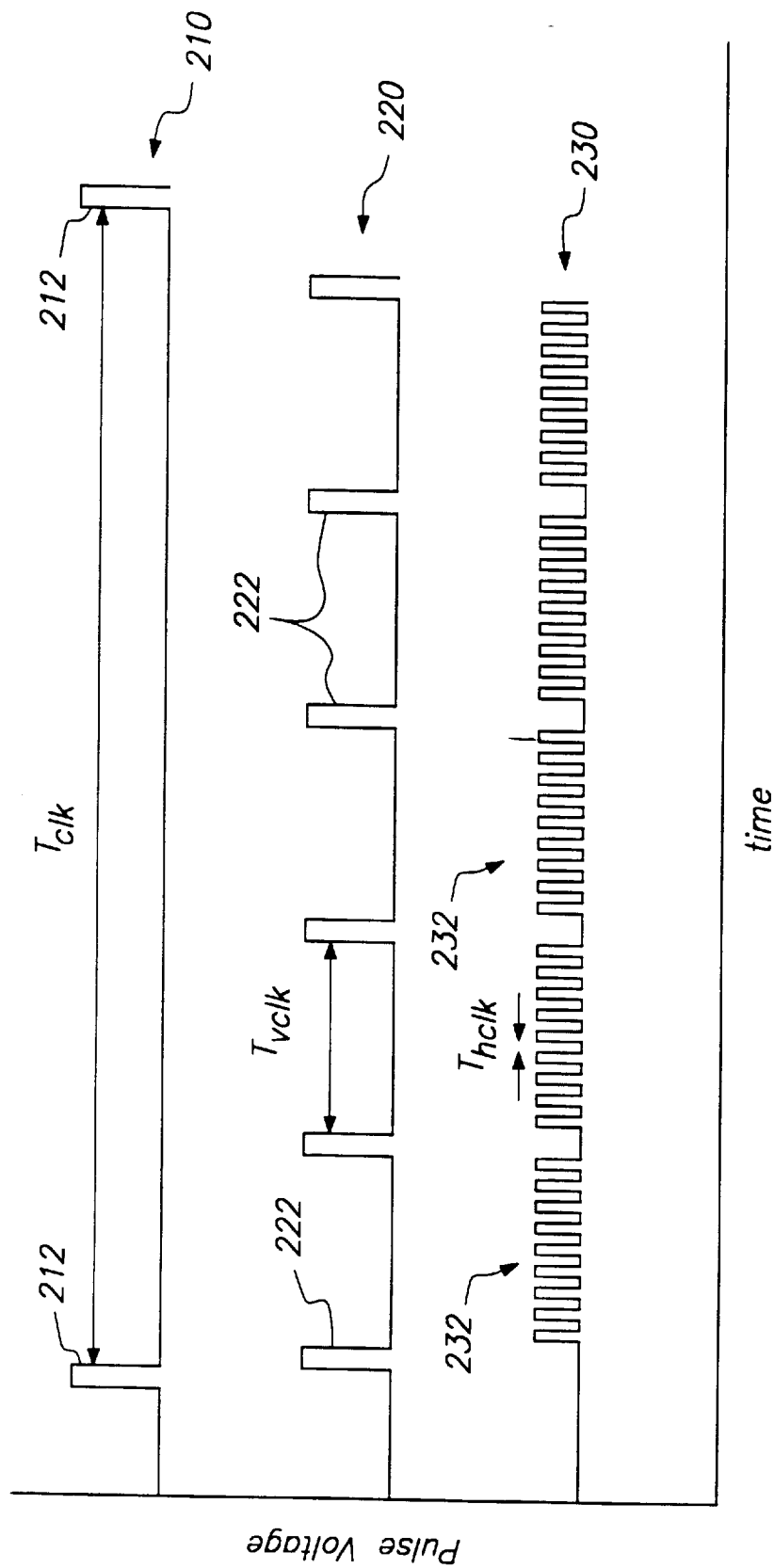
FIG. 2 is a timing diagram indicating the relative clocking rates used to couple image data from the pixels of an area imaging device to the serial output of the horizontal shift register using a uniform clocking scheme.

Referring now to FIG. 2, there are shown pulse trains 210, 220, 230 representing the default clock rates generated by clocking means 140 on timing lines 142, 144, 146, respectively, to transfer pixel data from photo-sensors 110 to serial output 134. Separations between pulses 212, 222, 232 of pulse trains 210, 220, 230, respectively, are not shown to scale. A clocking pulse 212 is generated on integration signal line 142 every $T_{clk}$ seconds to transfer data from pixels 110 to vertical shift registers 120. A clocking pulse 222 is generated on vertical signal line 144 every $T_{vclk}$ seconds to the k-pixels of each row 106(1)–106(n) up one charge transfer cell 122, transferring the pixel data in row 106(1) to horizontal shift register 130 every $T_{vclk}$ seconds. Clocking pulses 232 on horizontal signal line 146 then shift an entire row data (k-pixels) out of horizontal shift register 130 at serial output 134 within a period of $T_{hclk}$.

In the PAL standard, $(T_{clk})^{-1}$ is 50 Hz, $T_{vclk}$ is approximately 64 μs, and $T_{hclk}$ is on the order of 74.1 ns but varies with different types of devices. In the NTSC standard $(T_{clk})^{-1}$ is 60 Hz, $T_{vclk}$ is on the order of 63.75 μs, corresponding to a rate of 15.75 KHz, and $T_{hclk}$ is on the order of 74 ns, corresponding to a rate of 13.5 MHz.

In prior art area imaging devices, clocking pulses 232, 222 on horizontal and vertical signal lines 144, 146 are provided at the default uniform rates indicated above. In area imaging devices 100 operated in accordance with the present invention, the rate $(T_{hclk})^{-1}$ at which timing pulses are generated at horizontal signal line 144 is adjusted according to whether the pixel data currently in horizontal shift register 130 originated in an active, recovery, or inactive region 310, 320, 330 (FIG. 3) of area image array 108. Similarly, the rate $(T_{vclk})^{-1}$ at which vertical timing pulses are generated is adjusted according to the origin of pixel data moving up vertical shift registers 120(1)–120(k). Since $(T_{vclk})^{-1}$ is typically substantially less than the recommended maximum clocking rate for vertical shift registers 120(1)–120(k), this rate can be increased for pixel data originating in regions other than active region 310 (FIG. 3) without affecting image quality. While, the disclosed embodiment of the invention is described with a single recovery region 320, additional recovery regions may be employed to allow a stepped adjustment of shifting rates $(T_{hclk})^{-1}$, $(T_{vclk})^{-1}$.

Figure 3:
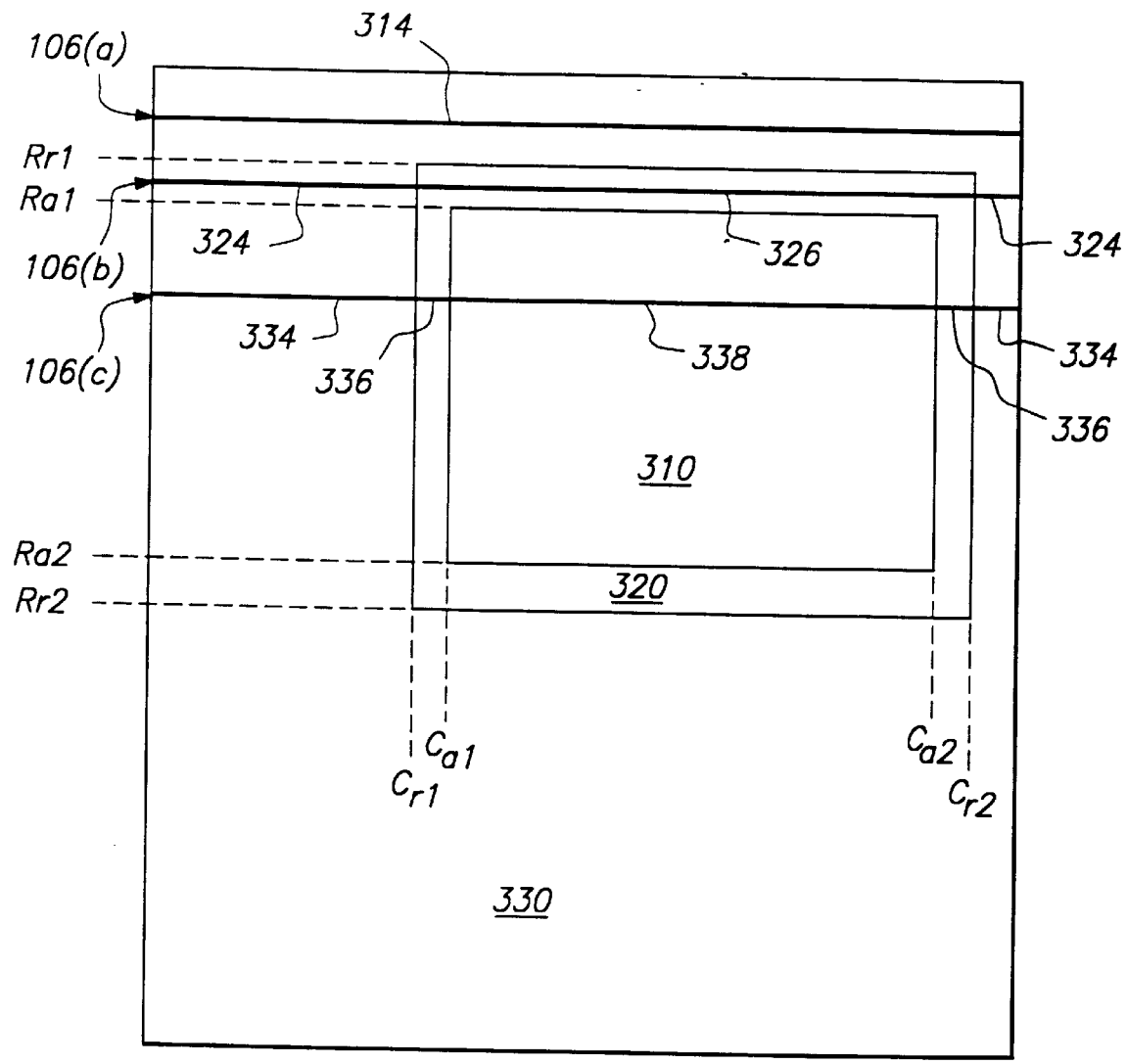
FIG. 3 is a representation of an area image sensor having inactive, recovery, and active regions designated in accordance with the present invention.

Referring now to FIG. 3, there is shown a block diagram of area image array 108 divided into active, recovery, and inactive regions 310, 320, 330, respectively. The boundaries of regions 310, 320, 330 are set according to which of the underlying pixels are providing data to be displayed by area imaging device 100. For example, active region 310 may correspond to the present location of an image window that is being panned across area image array 108 or it may correspond to an area selected for magnification.

Also shown in FIG. 3 are pixel rows 106(a), 106(b), 106(c) which intersect different regions 310, 320, 330 of image array 108. For example, pixel row 106(a) includes only pixels 314 in inactive region 330 as do adjacent pixel rows (not shown). Pixel row 106(b), on the other hand, includes pixels 324 in inactive region 330 as well as pixels 326 in recovery region 320, and pixel row 106(c) includes pixels 334 in inactive region, pixels 336 in recovery region 320, and pixels 338 in active region 310. Also shown in FIG. 3 are row and column indicators $R_{r1}$, and $C_{r1}$, $R_{r2}$, $C_{r2}$, of the positions at which recovery region 320 begins and ends, and indicators $R_{a1}$, $C_{a1}$ and $R_{a2}$, $C_{a2}$ of the positions at which active region 310 begins and ends.

In accordance with the present invention, $T_{vclk}$ and $T_{hclk}$ are adjusted independently as different groups of pixels are shifted upward in vertical shift registers 120(1)–120(k) and out of horizontal shift registers 130, respectively. For example, as pixel data originating in top row 106(1) through $R_{r1}$ are shifted out of horizontal shift register 130, a high rate $(T_{hclk})^{-1}$ may be used. In addition, since pixel data from inactive region 310 is not used for image generation, there is no reason to adhere to the line time $T_{vclk}$ specified in the standard, i.e. 63.75 µs for PAL images. Consequently, $(T_{vclk})^{-1}$ can be increased for all pixel rows 106 up to $R_{r1}$.

As rows including pixels from recovery region 320, i.e. those originating between $R_{r1}$ and $R_{a1}$, reach horizontal shift register 130, $(T_{vclk})^{-1}$ may be adjusted to a lower rate. In addition, $(T_{hclk})^{-1}$ is separately adjusted, with a high rate maintained as non-active pixels 324 are shifted out of horizontal shift register 130 and a slower rate selected as recovery pixels 326 are shifted out of horizontal shift register 130.

As rows between $R_{a1}$ and $R_{a2}$ reach horizontal shift register, $(T_{vclk})^{-1}$ is adjusted to the rate specified by the standard (PAL or NTSC) and $(T_{hclk})^{-1}$ is adjusted according to the type of pixel data being shifted out of horizontal shift register. For example, $(T_{hclk})^{-1}$ is maintained at a high rate as non-active pixel data 334 is shifted out of horizontal shift register 130. $(T_{hclk})^{-1}$ is reduced when recovery pixel data 336 is shifted out and $(T_{vclk})^{-1}$ is adjusted again as active pixel data 338 is shifted out. In general, a faster horizontal clocking rate $(T_{hclk})^{-1}$ is used to shift pixels 334, 324, 314 from inactive regions through horizontal shift register, since incomplete charge transfer for this pixel data has no impact on the displayed image (active region 310). An intermediate horizontal clocking rate $(T_{hclk})^{-1}$ is used when pixels 336, 326 from transition region 320 are shifted through horizontal shift register 130.

Rows 106 between $R_{a1}$ and $R_{a2}$ include pixels originating in active region 310, and vertical clocking rate $(T_{vclk})^{-1}$ must meet the specified standard, i.e. 63.75 µs for PAL images. Accordingly, $(T_{hclk})$ is selected for inactive, recovery, and active pixel data 334, 336, 338 consistent with the following constraint.

$$T_{vclk}=(C_{a1}-C_{a2})T^a{}_{hclk}+2(C_{r1}-C_{a1})T^r{}_{hclk}+(C_{r1}+C_w-C_{r2})T^i{}_{hclk} \quad (I)$$

Here, $C_w$ is the column width for area image array 108 (typically 512 pixels) and the superscripts "a", "r", and "i" indicate the pulse periods for pixel data originating in active, recovery, and inactive regions 310, 320, 330, respectively. The constraint represented by (I) assumes that recovery region 320 has equal horizontal widths on either side of active region 310, i.e. $(C_{r1}-C_{a1})=(C_{r2}-C_{a2})$. This is not a necessary condition of the present invention, and there may be some circumstances in which it is useful for recovery region 320 to have different horizontal widths before and after active region 310.

Recovery region 320 is defined in image area array 108 to counter the fact that operating horizontal shift register 130 at rates greater than the recommended $(T_{hclk})^{-1}$ does not allow full charge transport in from charge transfer cells 132. By defining a recovery region 320 in which $(T^r{}_{hclk})^{-1}$ is reduced as active region 310 is approached vertically and horizontally, excess charge in vertical and horizontal charge transfer cells 122, 132 is swept out before corresponding pixels of active region 310 are reached. Excess charge accumulation in transfer cells 132 is increased when horizontal shift register 130 is overclocked to shift out inactive pixels. In order to fully flush horizontal shift register 130, the optimal recovery rate $(T^r{}_{hclk})^{-1}$ may be below the recommended operating rate for horizontal shift register 130. Once flushing is completed, pixels originating in active video region 310 may be shifted out of horizontal shift register 130 at a rate that is equal to or slower than the recommended rate, allowing full development of all charge associated with pixels in active window region 310.

Figure 4:
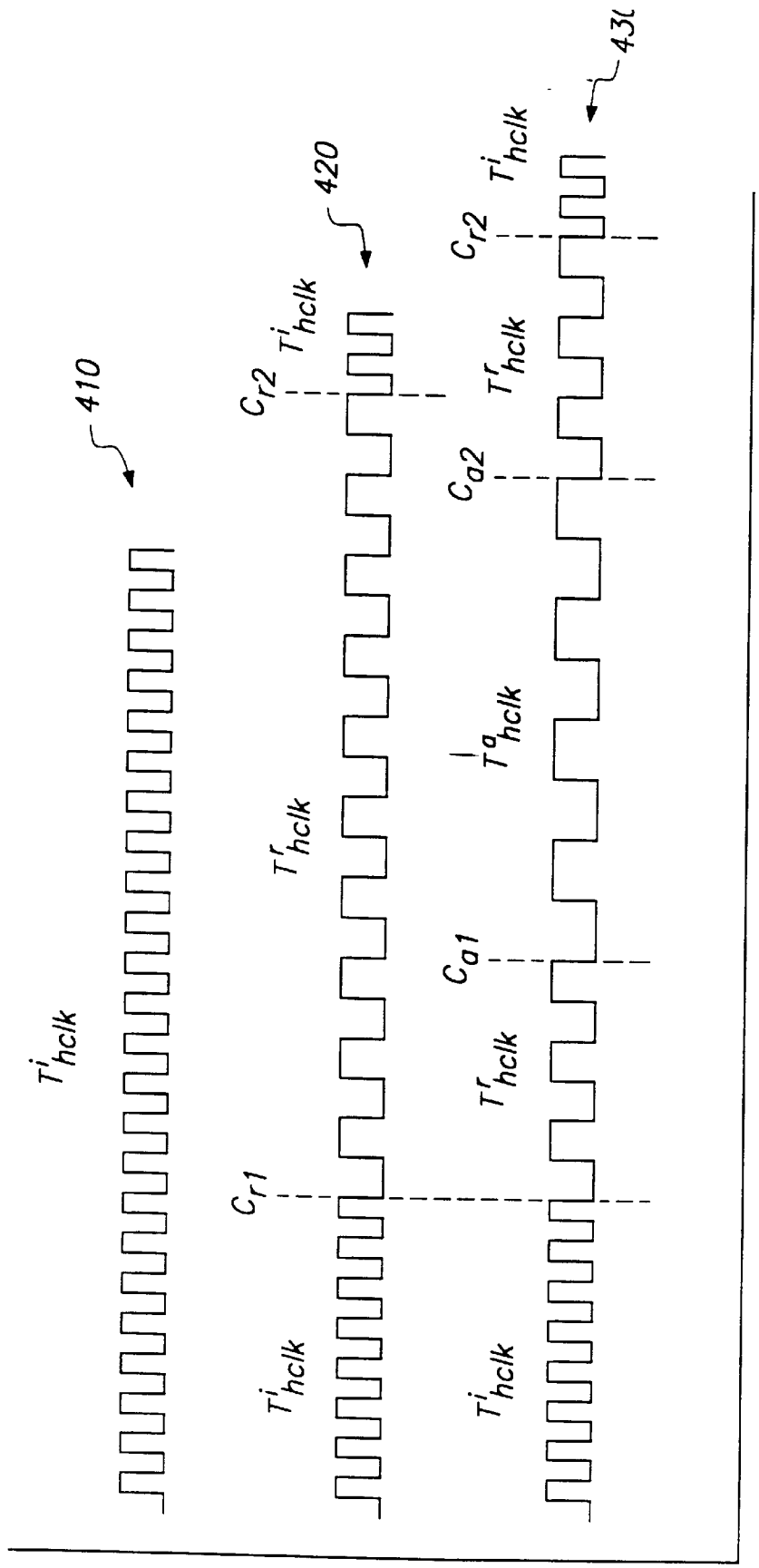
FIG. 4 is a timing diagram showing the variation in the horizontal clocking rate as a function of scan position for a system in accordance with the present invention.

Referring now to FIG. 4, there are shown pulse trains 410, 420, 430 output on horizontal signal line 146 for each of pixel rows 106(a), 106(b), 106(c), respectively, for the case in which $(T^i{}_{hclk})^{-1}>(T^r{}_{hclk})^{-1}>(T^a{}_{hclk})^{-1}$. Also indicated in FIGS. 3 and 4 are the column positions, $C_{r1}, C_{r2}$ at which recovery region 320 begins and ends, respectively, and the column positions $C_{a1}, C_{a2}$ at which active region 310 begins and ends. As can be seen from FIG. 4, $T_{hclk}$ is adjusted as shifting of pixels 324, 334 from inactive region 330 is completed and shifting of pixels 326, 336 from recovery region 320 begins. Similarly, $T_{hclk}$ is adjusted when shifting of pixels 336 from recovery region 320 is completed and shifting of pixels 338 from active region 310 begins. For example, pixel row 106(a) includes only pixels within inactive region 330. Consequently, $T_{hclk}$ is kept relatively short since these pixels do not form part of displayed image 150 any distortion due to incomplete charge transfer from vertical and horizontal charge transfer cells 122, 132 is immaterial.

Pixel row 106(b) includes pixels from inactive region 330 up to $C_{r1}$, pixels from recovery region 320 between $C_{r1}$ and $C_{r2}$, and pixels from inactive region following $C_{r2}$. Accordingly, when horizontal shift register 130 begins shifting out pixels originating in row 106(b), pixels are clocked out at high $T_{hclk}$ until $R_{r1}$ is reached. Pixels between $C_{r1}$ and $C_{r2}$ are clocked out of horizontal shift register 130 at a slower $T_{hclk}$, and above $C_{r2}$, pixels are again shifted out at a higher $T_{hclk}$.

Pixel row 106(c) includes pixels from inactive region 330 up to $C_{r1}$ and following $C_{r2}$, pixels from recovery region 320 between $C_{r1}$ and $C_{a1}$ and between $C_{a2}$, and $C_{r2}$, and pixels from active region 310 between $C_{a1}$ and $C_{a2}$. Accordingly, $T_{hclk}$ is smallest for pixels originating before $C_{r1}$ and after $C_{r2}$. $T_{hclk}$ is longer for pixels originating between $C_{r1}$ and $C_{a1}$ and between $C_{a2}$, and $C_{r2}$, to allow sufficient time for accumulated charges in associated charge transfer cells 132 to dissipate. As shown in FIG. 4, $T^r{}_{hclk}$ is intermediate between $T^i{}_{hclk}$ and $T^a{}_{hclk}$. However, it may be that image quality is improved if $T^r{}_{hclk}$ is greater than $T^a{}_{hclk}$, provided $T^a{}_{hclk}$ is long enough to allow for complete discharge of transfer cells 132 for active pixel date 338 which are displayed in image 150. Both situations are considered to be within the scope of the present invention.

Figure 5:
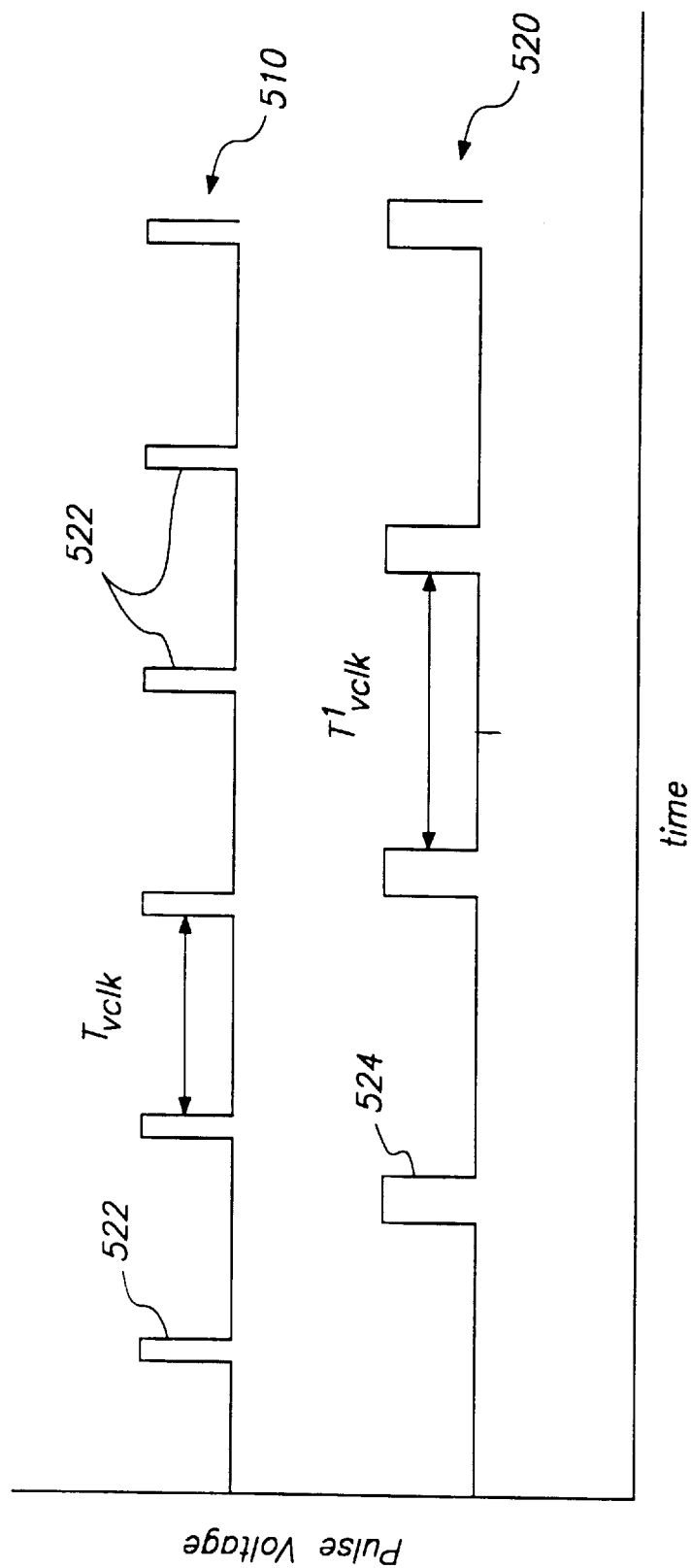
FIG. 5 is a timing diagram showing the variation in vertical clocking rate as a function of scan position for a system in accordance with the present invention.

Referring now to FIG. 5, there are shown vertical timing pulses 510, 520 suitable for shifting pixel data up vertical shift registers 120(1)–220(k) for data lines 160 with and without active pixel data. In the former case, $T_{vclk}$ is constrained by the image standard employed by area imaging device 100. While only two vertical clocking rates are shown, additional intermediate vertical clocking rates may be employed to facilitate the transition between high and low vertical clocking rates.

Figure 6A:
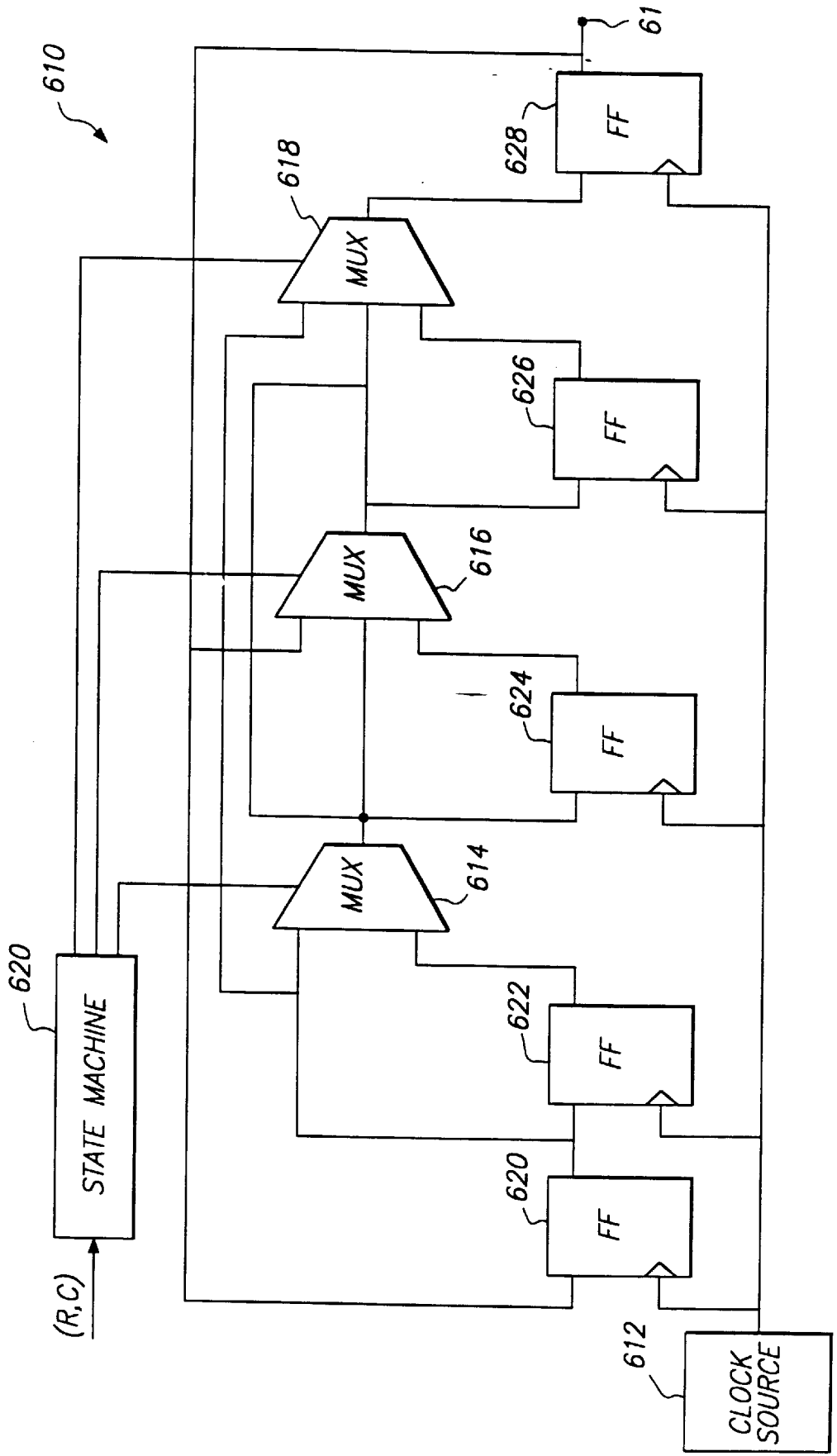
FIGS. 6A–6C are block diagrams of different circuitry for implementing the non-uniform clocking rates of the present invention.

Referring now to FIG. 6A, there is shown a clocking circuit 610 suitable for use as clocking means 140 of FIG. 1. Clocking circuit 610 is a variable length shift register comprising a chain of flip-flops 620–628 for coupling signals from a clock source 612 to an output 613. In the disclosed embodiment, output 613 is coupled to horizontal signal line 146 of FIG. 1. Multiplexers 614–618 provide a series of bypassing routes relative to flip-flops 620–628, so that signals from clocking source 612 can be routed past selected flip-flops 620–628 to provide higher or lower clocking rates as desired.

A state machine 620 includes logic necessary to activate multiplexers 614–619 according to the boundaries of active, recovery, and inactive regions 310, 320, 330, respectively, indicated by {R,C} in the figure. The location information may be provided through an input device such as when a mouse is used to indicate the image area to be zoomed or scanned. Alternatively, it may be provided under software control by an application program.

State machine 620 may also include logic for defining active, recovery, and inactive regions 310, 320, 330 from the display format of a monitor, video terminal, or other display device (monitor) and a different image format employed by the area imaging device 100. Such logic in effect converts an image collected in one format, i.e. PAL, for display on a monitor designed for a different format, i.e. NTSC. This could be accomplished, for example, by specifying to the state machine 620 the total row and column numbers in the display format of the monitor using {R,C}. Using this area as the active region, the logic would then determine the row and column locations in the format employed by area imaging device 100 at which recovery and inactive regions 320, 330, respectively, are located.

An area imaging device 100 including such logic in state machine 620 employs the non-uniform clocking scheme of the present invention to implement this format conversion. The active image area is defined by the full set of pixels specified in the format suitable for the monitor and their location within the pixel array of the device, as specified in the device format. All unused pixels of the device would be designated as recovery or inactive regions. This format conversion will be possible as long as the numbers of pixel rows and columns specified in the format of the area imaging device equal or exceed the corresponding numbers in the format of the monitor. For example, an NTSC monitor has the same number of columns as a PAL 512×582 area imaging device 100 but uses only 480 of the 582 rows (lines) of pixels. State machine 620 would convert formats by designating the first 480 lines of 512 bits as active region 310, and assigning the remaining 112 lines of 512 bits to recovery and inactive regions 320, 330, respectively. Similar logic units may be included in state machines 644, 680, discussed below in conjunction with FIGS. 6B and 6C.

Figure 6B:
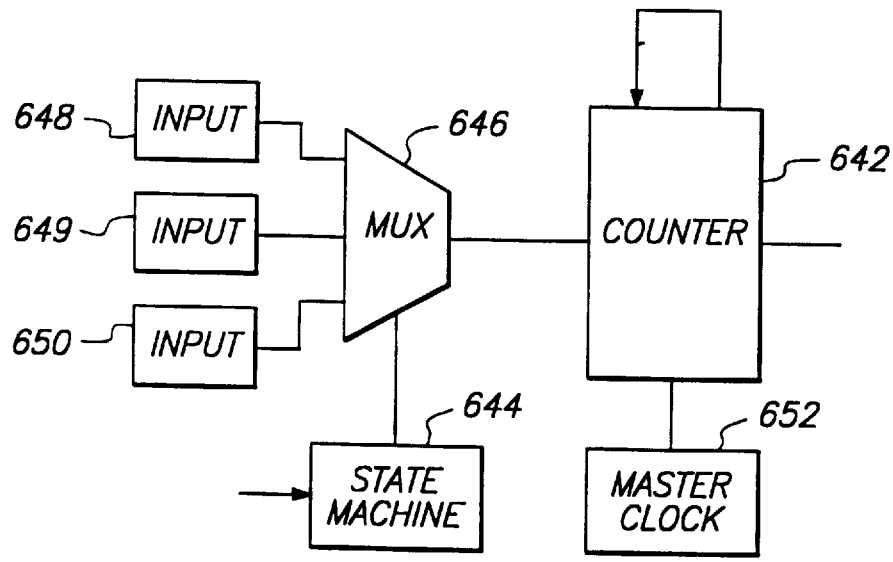

Referring now to FIG. 6B, there is shown another clocking circuit 640 suitable for use as clocking means 140 of FIG. 1. Clocking circuit 640 is a variable modulus counter comprising a counter 642, state machine 644, and a multiplexer 646 having different modulus inputs 648–650. Counter 642 includes an input for receiving a signal from a master clock 652 and an input for receiving a signal from one of modulus inputs 648–650 through multiplexer 646. State machine 644 receives information on the location of active, recovery, and inactive regions 310, 320, 330 and indicates which of modulus inputs 648–650 should be coupled to counter 642. Counter 642 then outputs a pulse on horizontal (vertical) signal line 144 equal to the master clock rate divided by the selected one of modulus inputs 648–650.

Figure 6C:
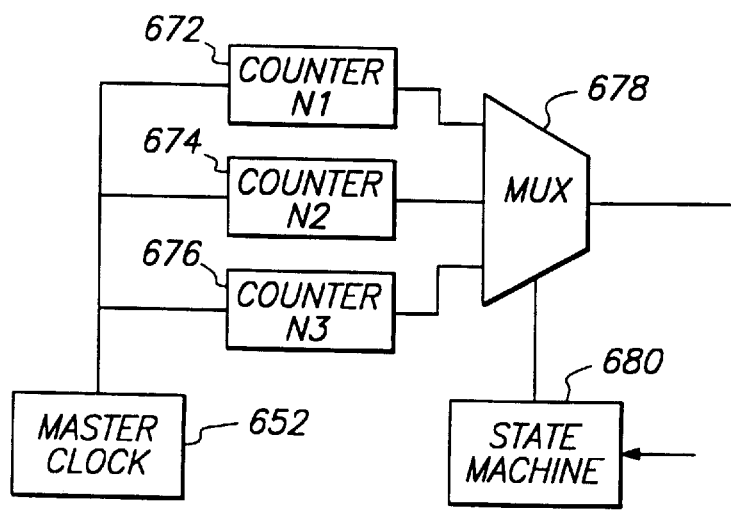

Referring now to FIG. 6C, there is shown still another clocking circuit 670 suitable for use as clocking means 140 of FIG. 1. Clocking circuit 670 comprises a master clock 652, a state machine 680, a multiplexer 678, and counters 672, 674, 676. Each of counters 672, 674, 676 has a different fixed modulus to provide outputs at submultiples 1/N1, 1/N2, 1/N3 of the frequency of master clock 652. State machine 680 receives location information on active, recovery, and inactive regions 310, 320, 330 and selects the output of one of counters 672, 674, 676 as $(T_{hclk})^{-1}$ for driving horizontal shift register 130 at the corresponding frequency.

Circuits similar to those shown in FIGS. 6A, 6B, and 6C may be used to provide $(T_{vclk})^{-1}$ for driving vertical shift registers 120(1)–120(k) according to which of regions 310, 320, 330 is the source of the pixel data being shifted into horizontal shift register 130.

There has thus been disclosed a system and method for processing data from an area imaging device using non-uniform clocking rates. The system and method allow data from active regions of the area imaging device to be developed and displayed without distortion while rapidly sweeping pixel data from inactive (undisplayed) regions of the area imaging device through the horizontal and vertical shift registers. In addition, images collected by a larger area imaging device can be displayed on monitor suitable for a smaller format by rapidly sweeping through the shift registers pixel data from unused regions of the area image array.

What is claimed is:

1. A method for transferring pixel data that includes image and non-image pixels to a serial output of a shift register, wherein the pixel data is arrayed as a plurality of rows of a fixed number of pixels and each pixel is associated with a row and column, the method comprising the steps of:

identifying the row and column of each image pixel;

defining a recovery region as including non-image pixels originating in rows and columns proximate to an image pixel;

loading the rows of pixels sequentially into the shift register;

coupling the non-image pixels of the recovery region out of the shift register at a first rate;

coupling image pixels out of the shift register at a second rate that is slower than the first rate; and coupling the non-image pixels proximate to the image pixels out of the shift register at a third rate to reduce image distortion.

2. The method of claim 1, wherein the third rate is slower than the second rate.

3. The method of claim 1, wherein the third rate is faster than the second rate and slower than the first rate.

4. The method of claim 1, wherein the step of loading the rows of pixels sequentially into the shift register, comprises the substeps of;

loading each row of pixels that includes image pixels into the shift register at a first loading rate; and loading each row of pixels that includes no image pixels into the shift register at a second loading rate that is faster than the first loading rate.

5. A method for transferring to a serial output of a shift register a two dimensional array of pixels including image and non-image regions and organized as a plurality of rows comprising a fixed number of pixels each, the method comprising the steps of:

classifying as image pixels each pixel that falls within the image region of the two dimensional array;

classifying as non-image pixels each pixel that falls outside the image region of the two dimensional array;

shifting the plurality of rows of pixels sequentially into the shift register;

for each row, coupling the non-image pixels out of the shift register at a first rate and coupling the image pixels out of the shift register at a second rate that is slower than the first rate;

classifying as recovery pixels each non-image pixel that is proximate to an image pixel in the two dimensional array; and coupling the non-image pixel proximate to the image pixel at a third rate to reduce image distortion.

6. The method of claim 5, wherein the coupling step comprises for each row, coupling the recovery pixels out of the shift register at a third rate that is slower than the first rate.

7. The method of claim 6, wherein the third rate is slower than the second rate.

8. The method of claim 7, wherein the third rate is faster than the second rate.

9. The method of claim 5, wherein the shifting step comprises the substeps of:

shifting each row that includes image pixels into the shift register at a first shift rate; and shifting each row that does not include image pixels into the shift register at a second shift rate.

10. The method of claim 5, wherein the image pixel classifying step comprise the substeps of:

identifying row and column numbers specified by a first image format of a display device;

identifying row and column numbers specified by a second image format associated with the two dimensional array of pixels;

associating row and column numbers of the first image format with a subset of row and column numbers of the second format; and classifying as image pixels all pixels originating at row and column numbers within the subset of row and column numbers of the second format.

11. The method of claim 10, wherein the non-image pixel classifying step comprises classifying as non-image pixels each pixel originating in a row and column number that is not within the subset of row and column numbers of the second format.

12. An area imaging device for displaying an active image region of an area image sensor, the area imaging device comprising:

a horizontal shift register including a plurality of charge transfer cells one of which is coupled to a serial output;

a plurality of vertical shift registers, each including a plurality of charge transfer cells and each coupled to one of the charge transfer cells of the horizontal shift register;

a plurality of photo-sensors, each of which is associated with a charge transfer cell of one of the plurality of vertical shift registers to form the area image sensor; and a state machine coupled to at least one clock sequencer and the area image sensor for tracking an origin for each pixel datum and coupling the pixel datum from the horizontal shift register at a first, second, or third rate according to whether or not the pixel datum originated in an active image area, a non-image area, or a recovery area of the area image sensor, the second rate is slower that the first rate, each clock sequencer used to clock a respective image area.

13. The area imaging device of claim 12, wherein the state machine comprises:

an input for receiving first format information on a display device associated with the area imaging device; and logic for specifying the active image area based on the received first format information and a second format associated with the area imaging device to display an image collected in the second format on the display device designed for the first format.

* * * * *